Patented Apr. 27, 1948

2,440,546

UNITED STATES PATENT OFFICE 2,440,546

SYMBIOTIC PROCESS FOR PREPARING YEAST AND OTHER PRODUCTS

George A. Jeffreys, Salem, Va., assignor, by direct and mesne assignments, to Nelson Littell, New Canaan, Conn.

No Drawing. Application November 3, 1941, Serial No. 417,709

11 Claims. (Cl. 195—90)

In my copending application, Serial No. 417,708, filed November 3, 1941, I have disclosed and claimed a new process for producing yeast, B complex vitamins and various new products containing these and other beneficial factors. In that process solid particles or granules, such as vegetable or cereal particles, brans, etc., are coated with films of a nutrient solution inoculated with yeast, i. e. of an active yeast wort, then formed into foraminous or air-pervious masses, and then aerated for a number of hours under suitable incubation conditions until the desired growth of yeast and other factors has been attained. The resulting cultured composite products are dried and utilized as beneficial food products or enriching ingredients for foods; or the cultured products may be treated so as to obtain yeast in compressed or other usable form and also liquid extracts or concentrates rich in enzymes and vitamins of the B complex.

The preferred embodiments of said process produce an exceedingly high yield of yeast from nutrients contained in the wort, together with an additional yield from nutrients assimilated by the growing yeast from the cereal particles or bran. In the practice of the process there occurs a synthesis of B complex vitamins, in addition to that attributable solely to yeast growth, which results in a 100 to 300%, or greater, increase in the vitamin content of the culturing material. The process also is more efficient and more economical than known methods of growing yeast in liquid media; it permits the use of worts of higher density; a much smaller amount of yeast is required to seed the worts and a greater yield of yeast is obtained from the available nutrients.

An object of the present invention is to provide certain modifications or improvements of said process which enhance its efficiency and the value of its products.

Another object of my invention is to provide a symbiotic process for growing yeast and other beneficial food constituents.

A further object hereof is to provide improved or modified food products, by-products, or ingredients for foods, of the types disclosed and claimed in said copending application, which are characterized by higher contents of yeast and B complex vitamins and also by the presence of certain molds and of enzymes excreted thereby which contribute valuable properties to the products.

According to the present invention, I have discovered that, when yeast is grown by coating vegetable granules or particles with a suitable active yeast wort and aerating and incubating the coated particles in air-pervious masses, a greatly increased production of yeast and beneficial enzymes may be obtained by carrying out the yeast growth in conjunction with the growth of certain molds. When the granules or particles include vitamin-containing bran or the like, there also is a pronounced increase in the synthesis of B complex vitamins during the incubation. These results appear to be due to a symbiotic action that takes place during the conjoint growth of yeast and molds under the conditions of my process.

For example, comparing results obtained pursuant hereto with the results of similar operations in the absence of growing molds, the yield of yeast cells is usually increased about 25 to 50%, and there are at least corresponding increases in beneficial vitamin factors. An assay of cultured composite products, on a dry basis, showed the presence of 1500 to 2200 International units of vitamin $B^1$ per pound in a product cultured without molds, as compared with 2500 to 3000 International units of vitamin $B^1$ per pound in a similar product cultured with molds according to the present disclosure.

In one method of practicing this invention, I form a suitable active yeast wort with an inoculum of mold spores, then mix the wort with solid particles or granules of plant or vegetable origin so as to coat the particles with films of the wort, and then culture or incubate the coated particles in air-pervious masses while subjecting the same to substantially continuous aeration. The temperature and humidity conditions prevailing during the incubation preferably are controlled within certain limits by regulating the temperature, humidity and flow rate of air that is circulated through the masses. After the material has cultured for a prolonged period, usually about 18 to 36 hours for maximum results, a moist cultured composite product is obtained in which a pronounced development of beneficial food factors has occurred. Such products are used as a source of yeast, vitamins and enzymes, or they are dried and employed in composite form as foods or enriching ingredients for foods.

I have observed little or no difference between practices of my process, with and without the presence of growing molds, during the first few hours of incubation. But as the culturing progresses, and particularly in the last few hours, the culture containing molds attains a much greater yeast growth. It appears that the mold spores present in the wort germinate and that, as the mycelium develops, enzymes are produced which act upon carbohydrate or protein constituents, or both, of the coated particles and thus convert such constituents into a form more readily assimilable by the growing yeast. I have further found that the mycelium germinating from the spores is not detrimental to the yeast or other products of the process, but, instead, seems to be inhibited or absorbed by the yeast. From microscopic examination it appears that the yeast cells surround the young stalks of mycelium in several layers; hence that the yeast cells seem parasitic to the germinating molds and apparently limit the extent of their growth.

The results of the present process seem to be brought about through several symbiotic phenomena: First, the germinating and growing mold spores excrete enzymes which convert carbohydrates into fermentable sugars and convert proteins into forms more readily assimilable by the yeast. Second, it appears that certain end products of the growing yeast, which usually inhibit yeast growth after a certain stage has been reached, are affected by the growing molds in such manner as to allow prolonged active growth of the yeast. Further, the growing molds have a tendency to inhibit bacteria growth, and that keeps bacterial contamination from inhibiting the yeast growth.

In practicing this improved process I may use particles of various plant or vegetable substances which consist mainly of carbohydrates, such as starches, cellulose, sugars or more complex carbohydrates, or both carbohydrates and proteins. The use of such substances in discrete or granular form, as distinguished from a powdered or pulverized form, provides an extensive surface area for retaining film coatings of the wort and enables the coated particles to be formed into foraminous or air-pervious masses which may be comparatively thick yet still suitable for the movement of air therein between the particles and in contact with their wort coating.

Granular substances containing nutrients assimilable by growing yeast are particularly advantageous, such as particles of cereal grains and, especially, the brans or coatings and germs of cereal grains. Examples of these are comminuted, shredded, flaked or crushed grains of wheat, corn, oats, etc.; granual by-products of grains, such as soy-bean meal, gluten meal and malt sprouts; various brans, such as wheat bran, rice bran and corn bran; and hulls of seeds and grains, such as oat hulls, cotton seed hulls, etc. The brans or coatings and germs of grains are comparatively rich in vitamins that are increased and developed by the process. They and other particles of cereal grains also contain minerals, nitrogen compounds and certain substances, such as biotin, that stimulate the development of yeast.

Suitable vegetable particles which predominate in cellulose or other complex carbohydrates include cut straw, cut grasses, saw dust, wood pulp and the like. When using such substances, molds are selected for the wort which produce enzymes that will split the predominant carbohydrates, converting them into substances readily assimilable by the growing yeast. For example, molds which excrete cellulase, such as *Aspergillus cellulosae* or *Mucor roxii*, may be used with cellulosic substances, such as cut straw, saw dust, wood pulp and the like.

In preferred embodiments hereof, using brans or other particles of cereal grains that are rich in starches or starches and proteins, I have found molds of the genera Aspergillus and Mucor, for example, *Aspergillus oryzae*, *Mucor roxii* and similar species, to be best adapted for my purpose. Any other molds may be used which are non-toxic and which, while growing with the yeast, will produce diastatic and proteolytic enzymes that act upon starches and proteins in the particles.

The species or types of molds to be employed thus may be varied widely, depending upon the nature of the granular substance upon which the yeast and molds are to be grown and the purposes for which the cultured product is to be used. In general, molds are used which excrete enzymes that convert nutrients present in the granular substance into forms readily assimilable by growing yeast. In the case of granular substances predominating in carbohydrates, the molds should excrete enzymes that act on the carbohydrates and convert them into fermentable sugars. Where the granular substance contains protein nutrients, molds preferably are used which excrete proteolytic enzymes that convert proteins into amino acids assimilable by the yeast. It will be understood, of course, that the molds should not form toxic end products, and that they should not develop odors or flavors that would render the product objectionable for its intended use.

In forming the wort I generally make a solution of yeast nutrients in water, then pasteurize or substantially sterilize, filter and cool the solution if it is necessary to destroy wild micro-organisms, and then mix seed yeast and mold spores into the solution. The nutrient base may be of any type suitable for yeast growth, usually containing carbohydrates, such as sugar, starch or starch conversion products, as the principal dissolved ingredient. A fairly high content of sucrose or molasses facilitates yeast growth in the early stages of incubation, but when the yeast growth takes place in the presence of growing molds quite satisfactory results may be obtained with a larger content of starch in the wort than otherwise. In conjunction with such nutritive substances, a small proportion of a mineral yeast food or stimulant, such as ammonium sulfate, calcium super-phosphate, ($KH_2PO_4$), magnesium sulfate, ammonium phosphate, calcium sulfate, or the like, is included in the wort for best results.

The seed yeast is provided by adding compressed yeast or a suitable yeast culture to the nutrient solution. The active mold spores may be added directly or as a concentrated aqueous suspension. In comparison with common methods of growing yeast in liquid media, only a small amount of seed yeast is required. For example, I may use enough to give the wort about 10 million yeast cells per cubic centimeter. I usually add enough live mold spores to provide about 300,000 to 600,000 spores per cubic centimeter of wort. These concentrations, of course, may be varied widely and are mentioned only for illustration.

I may also include in the wort a small amount of a pure culture of lactic acid organisms, such as *Bacillus acidophilus*, *Bacillus bulgaricus*, *Streptococcus lactis* or the like, which develop lactic acid during the culturing operations and so inhibit bacterial growth. This practice, however, is not necessary, as the germination of mold spores in the present process has been found effective to keep the culture sufficiently pure without the addition of a lactic acid culture. When using such a culture, for example, I usually add about .05 to .1% of cultured milk containing the desired organisms. This inoculation may be beneficial in some cases as a means of securing the maximum growth of yeast.

The completed wort preferably has a density of 6° to 8° Baumé, or higher, which is considerably higher than the density of solutions used for the growth of yeast in liquid media. Worts more dilute than this obviously may be used if desired.

It is desirable that the coated vegetable particles, when ready to be cultured, possess a definite acidic condition conducive to the development of the yeast, vitamins and enzymes, a pH value between about 5.2 and 5.8 being most effective. It is also desirable that the solid particles be moistened with water before being coated, about 50 to 100% as much water, by weight, usually being mixed into cereal particles, depending upon their power of absorption. The desired acidic condition may be established by employing an aqueous acid solution for the moistening, for which purpose various mineral and organic acids may be used. In the case of cereal particles, such as bran, I find it preferable to use organic acids, such as lactic or citric acid, in such manner that the wort coating will have a pH value of about 5.2 to 5.4. For substances having a large content of cellulose, a mineral acid such as sulfuric or phosphoric acid is preferable, and the coated particles should have a pH of about 5.6 to 5.8 for best results.

In preparing particles to receive the wort coating, therefore, I usually moisten and acidify them with an appropriate acid solution, then sterilize the moist material by steaming it or heating it in other ways, and then cool the particles to about 32° C. or below. A prepared wort is then mixed with the particles to form the wort coating, care being exercised to avoid objectionable compacting of the mass. After this an air-pervious mass or masses are formed of the coated particles and treatment thereof is begun in a suitable incubator apparatus. Since aeration is essential, it is preferred to incubate the material in layers on perforated trays or shelves, air being forced through the perforations and the layers of material during treatment. During incubation the temperature of the culturing material should not be allowed to exceed about 42° C. nor to fall below about 25° C., although some departure from these limits is permissible if not prolonged. This temperature control may be effected readily by regulating the temperature or flow rate, or both, of the air employed for the aeration. The air should also be quite moist in order to supply moisture to the cultured material and avoid objectionable drying thereof during its development.

Any or all of the foregoing operations may be carried out in a batch, semi-continuous or continuous manner, as may be desired. It will be understood, of course, that continuous operations, to the extent that they may be practicable, are more efficient for large commercial production. Ordinary incubators having imperforate pans or shelves may be used for culturing the material, but in such instances the process is not likely to produce the maximum growth of yeast unless the thickness of the layers be small or the layers themselves be extraordinarily pervious to air circulating thereover.

In preferred practice the coated material is placed on perforated shelves or trays in layers usually 3" to 8" thick, and air at a predetermined temperature and humidity is circulated transversely through the shelves and the material thereon. During the period of incubation, the layers of material may be stirred gently from time to time to redistribute the coated particles and expose new areas of their coating to aeration. For example, after the first 8 hours or so of incubation I usually stir the material gently for a few minutes every two or three hours.

Within the limits of about 25° to 42° C., the optimum temperature range for the incubation is about 30° to 35° C., so that the air preferably is supplied at a temperature within that range. At the outset of treatment only a small amount of air is required, but as incubation progresses the air circulation should be increased to control the temperature of the material. To give the culture a good start I usually begin treating the coated material at about 30° C. and circulate air at about 30° C. in contact therewith. As the heat is generated by the culture, the excess heat is dissipated either by lowering the temperature of the air, say to about 28° C., or, preferably, by increasing the volume of air flow. For example, I usually continue to supply air at about 30° C. and increase the rate of air flow, as the incubation progresses, to the extent needed to keep the material within the desired temperature range. The air should be moist enough to prevent substantial drying of the culturing material, a relative humidity above 80% usually being employed.

The cultured product of the process is a moist, composite material consisting of vegetable particles impregnated and coated with a culture rich in yeast, vitamins and enzymes. The yield of yeast usually is about 125 to 140%, or more, based on the yield available from nutrients in the wort. When the granular material is a vitamin-containing bran or the like, the cultured product also shows an increase in vitamin $B^1$ and riboflavin ranging from about 300 to 400%, as compared with an increase of about 100 to 300% when the incubation is carried out in the absence of molds. There also is a large development of various beneficial enzymes, such as diastatic and proteolytic enzymes, which form valuable constituents of enriched foods for human or animal consumption.

This moist cultured material may be employed for the production of compressed yeast, vitamin B concentrates, or enzyme extracts, or of any one or more of these, or it may be subjected to various treatments to obtain new food products, enriching ingredients for food products, cultures or other by-products having beneficial qualities and uses. If the material is to be used as such, it is first dried in a separate drying apparatus, or in the incubator itself by agitating the material while passing comparatively dry air therethrough at the proper temperature and flow rate. Various well known types of hot air dryers may be used for this purpose.

By appropriate control over the drying temperatures various new products of different characteristics and utility may be obtained. If it is desired to retain the vitality of the yeast and any other micro-organisms contained in the product, drying temperatures are used which will not destroy these, say temperatures not exceeding about 43° C. A product so produced with edible granules may be used to advantage as a base for enriching special foods, or for therapeutic purposes. When vitality of yeast and organisms is not desired but it is desired to retain active enzymes in the product, the drying temperature is controlled accordingly, using a temperature, e. g., of about 50° to 60° C., in which case the yeasts are inactivated but the enzymes are retained. When the cultured material is dried at temperatures above about 60° C., but not exceeding about 82° C., the yeast, any lactic or other micro-organisms and the enzymes are inactivated without destruction of the vitamins.

Following is an example of the practice of the process herein disclosed for the production of a composite food product containing exceptionally high concentrations of yeast and vitamins of the B complex: Fifty parts, by weight, of a .75 per cent. sulfuric acid solution are mixed thoroughly with 100 parts of a granular mixture composed of 80 parts of wheat bran, 10 parts of soy-bean meal and 10 parts of malt sprouts. The resulting moist material is steamed for 10 to 20 minutes and then cooled.

A yeast wort having a molasses nutrient base is made as follows: To 100 parts of water are added 10–25 parts of molasses, ¾ part of ammonium sulfate, ⅛ part of calcium super-phosphate, and ⅛ part of magnesium sulfate. The solution is pasteurized by heating to boiling, and then filtered. After the filtrate has cooled sufficiently, about ¼ part of compressed seed yeast are added and mixed in. Having prepared a concentrated suspension of mold spores, say of *Aspergillus oryzae* obtained from a pure culture thereof grown on bran or other media, I then add enough of the suspension to provide about 500,000 spores per cubic centimeter of wort.

This wort is then sprayed and mixed thoroughly into the cool, moist bran mixture, in a ratio of about 3 parts of the wort to 4 parts of the solid particles. The mixing is continued until the particles are coated substantially uniformly with the wort, stirring paddles being used at a speed of rotation that imparts a "fluffy" consistency to the mass. The resulting coated material is placed in layers 5" deep on sterilized perforated shelves constituting parts of an enclosed incubating apparatus. The material preferably has a temperature of about 30° C. at this stage.

Culturing is then begun and continued for a period of about 24 hours until the desired growth of yeast and vitamins has been attained, air being circulated through the layers of material on the shelves during the entire period. The air is supplied at a temperature of about 30° C. and a relative humidity of about 90%. Starting at an aeration rate of about ¼ cubic foot of air per minute per 100 pounds of material in the incubator, the air circulation is increased gradually as the incubation progresses to about ½ to 1 cubic foot of air per minute per 100 pounds of material, the actual rate being that which is necessary to keep the material at a temperature between 30° and 35° C. After the first 8 hours of incubation, the material on the shelves is stirred gently for a few minutes every 2 or 3 hours.

When the incubation has been completed the cultured product is dried in the same apparatus by circulating compartively dry air therethrough, at a temperature of about 75° C., until the moisture content of the material has been reduced to 10 to 12%.

The dried product so obtained is a stable, composite food in which the yeast, molds and enzymes have been inactivated without adversely affecting the vitamin content. Each gram of the product contains about 400 to 800 million yeast cells, clustered in layers about incipient growth of mycelium adhering to the cereal particles. An assay of the product on a dry basis shows about 2500 to 3000 International units of vitamin $B^1$ per pound as compared with about 700 to 900 units per pound in the original dry bran mixture. There also have been proportionate accretions of riboflavin and other B complex vitamins, as well as a large development of diastatic and proteolytic enzymes. This product constitutes a valuable base or enriching medium for special foods, especially for use in animal and poultry feeds and the like.

The undried composite products of the present process may be employed to advantage as a source of compressed yeast or of valuable new concentrates of vitamins and enzymes, or of both. In obtaining such end products treatments may be used such as those disclosed and claimed in my copending applications, Serial No. 417,708, filed November 3, 1941, and Serial No. 417,710, filed November 3, 1941. For example, a suspension of the yeast in an extract containing vitamins and other factors may be obtained by washing the yeast culture from the product with water and separating the resulting suspension from the washed granular particles.

When products of the present process are made with edible cereals, such as wheat-bran, soy-bean meal, etc., they serve as an excellent base for enriching cereal breakfast foods, or other foods for human consumption, in yeast, enzymes and B-G complex vitamins. For example, a mixture of 80% cleaned wheat bran and 20% soy-bean meal may be used for this purpose, the moist cultured product being dried at temperatures sufficient to inactivate the molds and yeast without destroying the vitamins, except in special cases where vitality of the organisms is desired. Such a product will substantially enrich cereal foods and the like when added thereto in proportions of 2 to 25% or more, and the cost of producing the product is so low that its use in this manner is fully warranted. The product may be so used either in its natural granular state or after having been ground to any desired degree of fineness. When used in foods of different texture or physical appearance, it preferably is incorporated in a finely ground state.

Another new product may be a composite bran or cereal product for culturing or baking purposes. In this case edible granules, such as bran or bran mixtures, are coated with a wort and cultured as above described, but in the drying step low temperatures below about 43° C. are used exclusively in order to preserve the vitality of the organisms, particularly the yeast cells. When dried to a moisture content of 8 to 20%, this material can be preserved indefinitely in suitable containers. It may then be used, as desired, for inoculating various types of media for culturing, or as a substitute for compressed yeast in baking. For example, it may be used in amounts of about 25%, more or less, for baking whole wheat bread and other baked goods in which bran may be employed. In this way wholesome, appetizing, vitamin-enriched baked products may be produced.

Dried composite products of the process are useful also, with or without uncultured cereals added thereto in place of ordinary "feeding yeasts" or "cereal yeasts" for enriching various animal and poultry foods. The granular particles in such products may include edible foods, such as bran, corn grits, gluten meal and soybean meal, as well as malt sprouts and various other grain products suitable for animal consumption. Such particles, e. g., are coated with wort containing molasses as the main sugar and cultured as in other instances, the drying of the cultured product being carried out at either low or high temperatures, as may be desired.

Still other valuable products may be made and used as a binder and enriching medium in the pelleting of animal and poultry foods. In this case, the granular material containing carbohydrates as aforesaid should consist largely of a plant substance, such as soy-bean meal or gluten meal, which is comparatively free from fibre and tends to become glutinous. The wort here used may be of comparatively high density, containing, say, 20 to 25% of molasses, so as to provide an economical source of sugars possessing adhesive qualities. The drying of the cultured product is carried out to a moisture content of about 16 to 20%, consisting mostly of water crystallization. As a result of the treatment most of the starches of the original granular material are converted to sugars and changed to a plastic state. The dried product is utilized for pelleting by adding about 5 to 10%, thereof to the mash or meal to be pelleted. The pressure exerted by the pelleting machine causes a liquefaction of the sugar and plasticizes the proteins, so producing an adhesiveness that serves to combine the mash or meal into firm, shape-retaining pellets; and by reason of this action the steam or heat ordinarily employed in pelleting operations may be reduced in amount, or even eliminated altogether.

It will be understood by persons skilled in the art that various other products and by-products may be made by the use of the present invention, and also that the invention may be carried out in various ways without restriction to details of the illustrative embodiments set forth hereinabove. I therefore desire that my invention be accorded a scope fully commensurate with its novel contributions to the art, as intended to be set forth in the appended claims.

I claim:

1. A process for producing yeast- and vitamin-rich products which comprises forming air-pervious masses of vegetable particles coated with thin films of active yeast wort containing live spores of molds that in growing produce enzymes acting to convert constituents of said particles into substances readily assimilable by growing yeast and symbiotically cultivating yeast in said films in conjunction with a growth of said molds by aerating said masses while maintaining the same at temperatures conducive to active yeast propagation.

2. A process which comprises coating granular cereal particles which contain starches, proteins and B-complex vitamins with a wort containing live yeast and live molds that in growing develop diastatic and proteolytic enzymes, forming an air-pervious mass of the coated particles, and aerating and incubating said mass to produce a cultured composite product rich in yeast, vitamins and enzymes while maintaining the mass at a temperature conducive to yeast growth.

3. A process for producing a vitamin-rich culture of yeast on particles of cereal grains which comprises forming a pasteurized moistened mass of granular particles of cereal grains, including bran, coating said particles with a wort containing a carbohydrate nutrient base and inoculi of seed yeast and of mold spores which in growing develop enzymes that split nutrients of said base, forming air-pervious layers of the coated particles, and then culturing said layers while forcing moist air therethrough at a temperature and flow rate sufficient to keep the culture between about 25° and 42° C., until a prolific growth of yeast has occurred.

4. A process for producing a vitamin-rich culture of yeast on particles of cereal grains which comprises moistening granular particles of cereal grains, including bran, with an aqueous acid solution and coating the moistened acidic particles with a wort containing inoculi of yeast and of mold spores which in growing develop diastatic and proteolytic enzymes so as to obtain wort-coated particles having a pH between 5.2 and 5.8, forming air-pervious layers of the coated particles, and then culturing said layers while forcing moist air therethrough at a temperature and flow rate sufficient to keep the culture between about 25° and 42° C., until a prolific growth of yeast has occurred.

5. A process for producing a vitamin-rich culture of yeast on particles of cereal grains which comprises forming a wort-coated mass of granular particles of cereal grains, including bran, having a pH between 5.2 and 5.8 by moistening such particles with an aqueous acid solution and then coating the particles with a wort containing a carbohydrate nutrient base and inoculi of yeast, mold spores and lactic acid bacilli, said spores being of molds which in growing develop enzymes that split nutrients of said base, forming air-pervious layers of the coated particles, and then culturing said layers while forcing moist air therethrough at a temperature and flow rate sufficient to keep the culture between 25° and 42° C. until a prolific growth of yeast has occurred.

6. A process for producing yeast- and vitamin-rich products which comprises forming a mass of wort-coated vegetable granules having a pH of 5.2 to 5.8, said wort containing a carbohydrate nutrient base and inoculi of yeast and of mold spores which in growing develop enzymes that split nutrients of said base, forming air-pervious layers of said coated granules, and incubating said layers while forcing moist air therethrough at a temperature between about 28° and 32° C., until a prolific growth of yeast has occurred.

7. A process for producing yeast- and vitamin-rich products which comprises coating granular particles of cereal grains with an active yeast wort inoculated with mold spores of the genus Aspergillus, and aerating and incubating an air-pervious mass of the coated particles while maintaining the mass at a temperature conducive to yeast growth.

8. A process for producing yeast- and vitamin-rich products which comprises coating granular vegetable particles predominating in cellulose with an active yeast wort containing live spores of molds that in growing develop cellulase and aerating and incubating an air-pervious mass of the coated particles while maintaining the mass at a temperature conducive to yeast growth.

9. A process for producing yeast- and vitamin-rich products which comprises coating granular solids containing carbohydrates with thin films of an active yeast wort containing yeast nutrients and an inoculum of mold spores that in growing excrete enzymes that split such carbohydrates, forming air-pervious masses of the coated solids, and aerating and incubating said masses, while maintaining the same at temperatures conducive to activate yeast growth, so that prolific yeast growth results in the presence of conjoint mold growth and mold enzyme activity.

10. A process for producing yeast- and vitamin-rich products which comprises growing yeast in an air-pervious mass of granular particles of vegetable matter coated with thin films of an active yeast wort containing mold enzymes that split carbohydrate and protein nutrients in said matter to render them readily assimilable by the yeast, while aerating said mass and maintaining the same at temperatures conducive to activate yeast growth, and continuing as aforesaid until a prolific growth of yeast on said particles has occurred.

11. A process for producing yeast- and vitamin-rich products which comprises coating with an active yeast wort vegetable particles that contain nutrients readily assimilable by yeast and other nutrients, forming air-pervious masses of the coated particles, and aerating and incubating said masses in the presence therein of mold enzymes that render at least some of said other nutrients readily assimilable by yeast, while maintaining said masses at temperatures conducive to active yeast growth, until a prolific growth of yeast on said particles has occurred.

GEORGE A. JEFFREYS.

REFERENCES CITED

The following references are of record in the file of this patent:

UNITED STATES PATENTS

| Number | Name | Date |
|---|---|---|
| 454,586 | Bachman | June 23, 1891 |
| 621,796 | Collette | Mar. 28, 1899 |
| 1,474,674 | Jensen | Nov. 20, 1923 |
| 2,095,638 | Jeffreys | Oct. 12, 1937 |
| 2,223,465 | Schultz and Frey | Dec. 3, 1940 |
| 2,235,827 | Cregor | Mar. 25, 1941 |
| 2,276,710 | Bennett | Mar. 17, 1942 |
| 2,285,465 | Schultz et al. | June 9, 1942 |

FOREIGN PATENTS

| Number | Country | Date |
|---|---|---|
| 8,021 | Australia | July 6, 1933 |
| 221,592 | Great Britain | Sept. 18, 1924 |
| 272,447 | Great Britain | Mar. 29, 1928 |

OTHER REFERENCES

The Encyclopedia of Food, published by Artemus Ward, 50 Union Square, N. Y., pages 226, 482. (Copy in Div. 63.)

Petersen, Skinner, and Strong, Elements of Food Biochemistry, Prentice and Hall, Inc., N. Y., 1943, page 229. (Copy in Div. 63.)